United States Patent
Fukano et al.

(10) Patent No.: US 7,712,484 B2
(45) Date of Patent: May 11, 2010

(54) PAINT SELECTOR VALVE

(75) Inventors: Yoshihiro Fukano, Moriya (JP); Shoichi Makado, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 1250 days.

(21) Appl. No.: 11/176,215

(22) Filed: Jul. 8, 2005

(65) Prior Publication Data

US 2006/0038154 A1 Feb. 23, 2006

(30) Foreign Application Priority Data

Jul. 16, 2004 (JP) .............................. 2004-209573

(51) Int. Cl.
*F16K 11/22* (2006.01)
(52) U.S. Cl. ...................... 137/606; 137/881; 251/63.5; 251/321; 251/333
(58) Field of Classification Search ............... 251/63.5, 251/321, 318, 335.2, 63.6, 333; 137/606, 137/607, 884, 881
See application file for complete search history.

(56) References Cited

U.S. PATENT DOCUMENTS

| | | | |
|---|---|---|---|
| 1,922,911 A * | 8/1933 | Farmer | 251/63.6 |
| 3,572,366 A * | 3/1971 | Wiggins | 137/240 |
| 3,672,570 A | 6/1972 | Scarbrough et al. | |
| 3,811,470 A * | 5/1974 | Schaefer | 137/540 |
| 4,180,239 A * | 12/1979 | Valukis | 251/60 |
| 5,146,950 A | 9/1992 | Rodgers et al. | |
| 5,623,962 A * | 4/1997 | Danzy et al. | 137/469 |
| 5,934,520 A * | 8/1999 | Byerly et al. | 222/504 |
| 5,941,505 A * | 8/1999 | Nagel | 251/335.2 |
| 2002/0002999 A1 | 1/2002 | Fukano et al. | |
| 2004/0061086 A1 * | 4/2004 | Rodrigues | 251/63.5 |

FOREIGN PATENT DOCUMENTS

| | | |
|---|---|---|
| DE | 34 10 017 A1 | 9/1985 |
| DE | 691 09 949 T2 | 2/1996 |
| DE | 198 36 604 A1 | 3/2000 |
| DE | 693 32 680 T2 | 10/2003 |
| DE | 102 28 277 | 1/2004 |
| DE | 102 28 277 A1 | 1/2004 |
| EP | 0 467 626 B1 | 5/1995 |
| EP | 0 911 081 B1 | 2/2003 |
| EP | 0 979 964 B1 | 4/2004 |
| EP | 1 361 382 B1 | 4/2005 |
| GB | 2 159 243 A | 11/1985 |
| JP | 04-046280 | 4/1992 |
| JP | 06-117549 | 4/1994 |

(Continued)

*Primary Examiner*—John Rivell
*Assistant Examiner*—Andrew J Rost
(74) *Attorney, Agent, or Firm*—Paul A. Guss (57) ABSTRACT

A piston, which is displaceable by pilot air, is provided in a main body. A valve plug, which is composed of a resin material, is connected to an end of a shaft connected to the piston. The valve plug is seated on a valve seat section of a sub-body connected to the main body, and thus the flow of the paint to a flow passage is cut off. A seating section of the valve plug, which is to be seated on the valve seat section, is formed to be substantially spherical. Further, the surface of the valve seat section is recessed and substantially spherical corresponding to the seating section.

8 Claims, 10 Drawing Sheets

FOREIGN PATENT DOCUMENTS

| | | |
|---|---|---|
| JP | 10-153268 | 6/1998 |
| JP | 10-176763 | 6/1998 |
| JP | 11-22835 | 1/1999 |
| JP | 2002-022058 | 1/2002 |
| JP | 2002-243062 | 8/2002 |
| JP | 3360992 | 10/2002 |
| WO | 98/08615 | 3/1998 |

* cited by examiner

PAINT SELECTOR VALVE

BACKGROUND OF THE INVENTION

1. Field of the Invention

The present invention relates to a paint selector valve which makes it possible to switch the supply and the cutoff of a paint to be supplied to a fluid passage by opening and closing a valve plug by the aid of a pressure fluid.

2. Description of the Related Art

A painting system has been hitherto adopted, for example, to apply electrostatic painting to a painting objective such as a body of an automobile by applying a high voltage to a conductive paint. In such a painting system, the paint, which is supplied from a paint supply source, is supplied via a passage to a coating apparatus such as a spray gun so that the paint is sprayed from the coating apparatus to the painting objective. Usually, a paint selector valve is provided in the passage disposed between the paint supply source and the coating apparatus. The paint selector valve is used to supply and cut off the paint to be supplied to the coating apparatus.

A manifold, which has an outflow passage on the lower side of a casing, is connected to the paint selector valve as described above. A piston, which is provided in the casing, is displaced in an axial direction by the aid of pilot air. A valve shaft, which is connected to the piston, is integrally displaced. A valve section, which is composed of, for example, a resin material, is provided at the lower end of the valve shaft. The valve section is capable of being seated on a valve seat member which is formed at a lower portion of the casing and which is communicated with the outflow passage of the manifold. The valve section is separated from the valve seat member when the paint flows into the casing from an inflow port formed on the side surface of the casing, and thus the paint flows to the outflow passage of the manifold via an outflow port of the valve seat member (see, for example, Japanese Laid-Open Patent Publication No. 2002-243062).

In general, a variety of different paint colors are designated for the painting objectives such as automobiles to be subjected to the painting by using the painting system as described above. Therefore, when the painting is performed with the various different paint colors for the painting objectives, those provided corresponding to the number of the designated painting colors include a plurality of paint supply sections corresponding to the different paint colors, the outflow passages to be connected to the paint supply sections, the paint selector valves, and the coating apparatus. The paints having desired paint colors for the painting objectives are optionally supplied from the paint supply sections via the paint selector valves to the coating apparatus to paint the painting objectives with the desired different paint colors respectively.

However, in the painting system as described above, for example, the paint selector valves, the passages, and the coating apparatus, which correspond to the number and the amounts of the various different paint colors designated for the painting objectives, are required. Therefore, the equipment cost is increased for the painting system, and an extremely large installation space is required.

Therefore, in recent years, in order to simplify the arrangement and suppress the equipment cost of the painting system as described above, the following painting system is adopted. That is, a plurality of paint selector valves are provided for a manifold which has a single outflow passage for allowing the paint to flow therethrough. Further, a single coating apparatus, which is connected to the outflow passage, is provided. In the case of this painting system, the outflow passage and the coating apparatus are commonly used when the paints of the different paint colors flow therethrough and are sprayed.

Only the paint having the desired paint color is supplied from the paint selector valve via the outflow passage to the coating apparatus by allowing only one of the plurality of paint selector valves to be in the valve-open state, and thus the painting objective is painted with the desired paint color by spraying paint from the coating apparatus.

However, when the paint of another paint color is newly supplied to the outflow passage and the coating apparatus to perform the painting, the previous paint remains in the outflow passage and the coating apparatus, because the plurality of paints of the different paint colors are supplied to the single outflow passage and the single coating apparatus. It is necessary to completely remove the paint beforehand by washing, for example.

For example, when the conventional technique concerning Japanese Laid-Open Patent Publication No. 2002-243062 is applied to the painting system as described above, the paint tends to remain in the outflow port of the valve seat member when the valve section of the paint selector valve is seated on the valve seat member, because the valve section seated on the valve seat member is separated from the outflow passage by a predetermined spacing distance. Therefore, when the interior of the outflow passage and the coating apparatus is washed, it is difficult to completely remove the paint remaining in the outflow port. When the paint of another different paint color is supplied to the outflow passage via another paint selector valve, it is feared that the paint may be mixed with the remaining paint.

SUMMARY OF THE INVENTION

A general object of the present invention is to provide a paint selector valve which makes it possible to reliably avoid any liquid pool and any liquid leakage when a valve plug is seated on a valve seat section.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
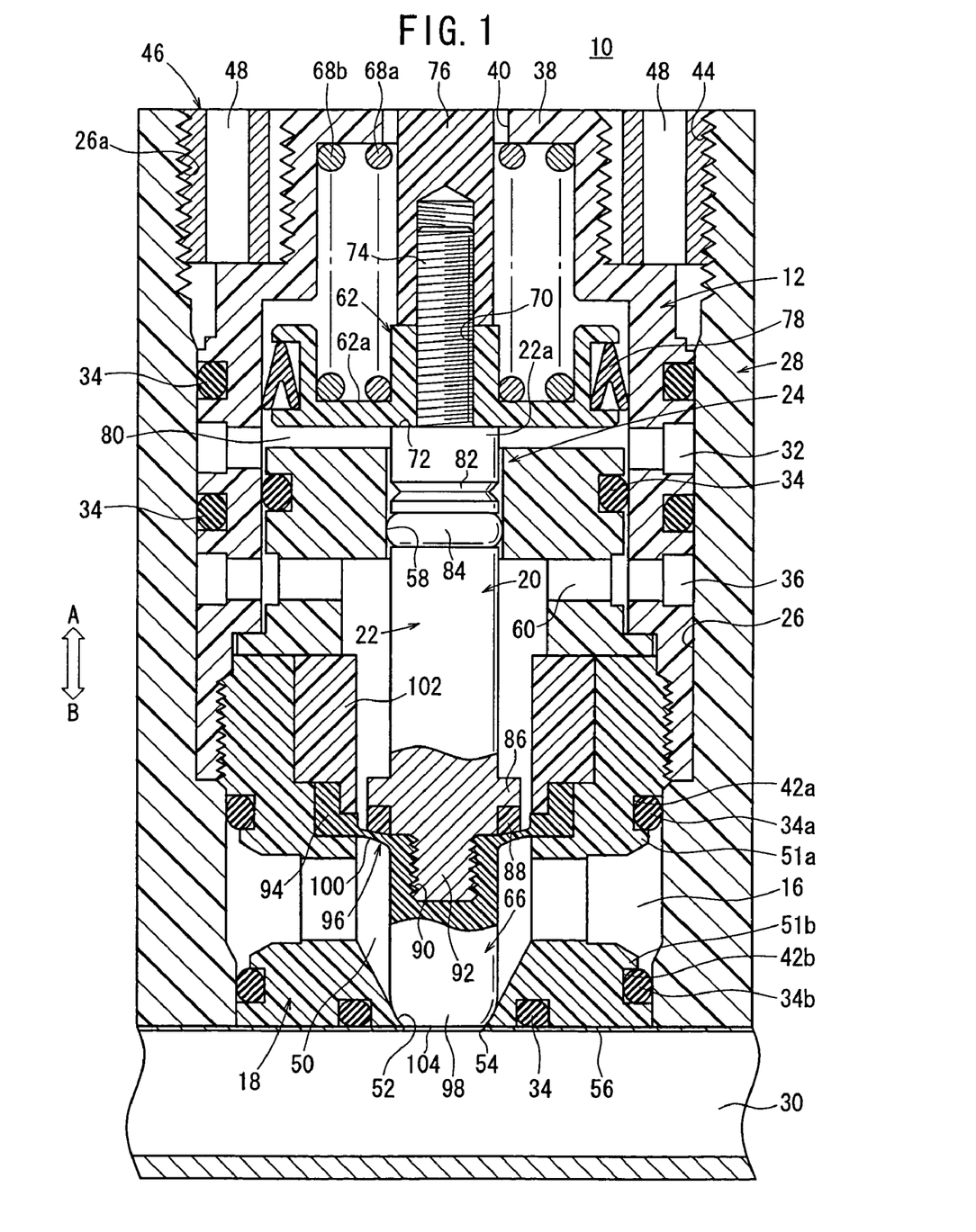
FIG. 1 is a vertical sectional view illustrating the valve-closed state of a paint selector valve according to a first embodiment of the present invention.

With reference to FIG. 1, reference numeral 10 indicates a paint selector valve according to a first embodiment of the present invention.

Figure 2:
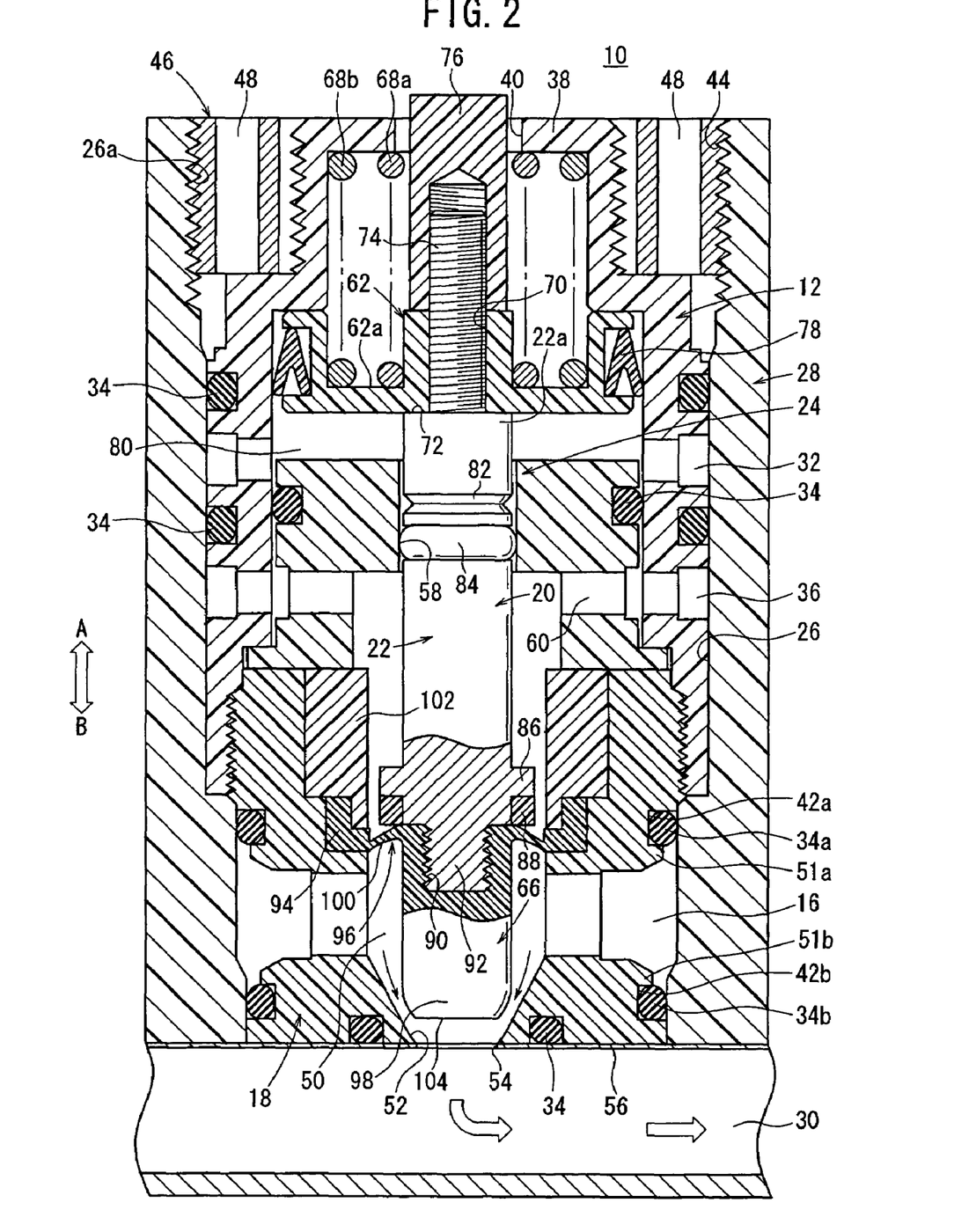
FIG. 2 is a vertical sectional view illustrating the valve-open state of the paint selector valve shown in FIG. 1.
Figure 7:
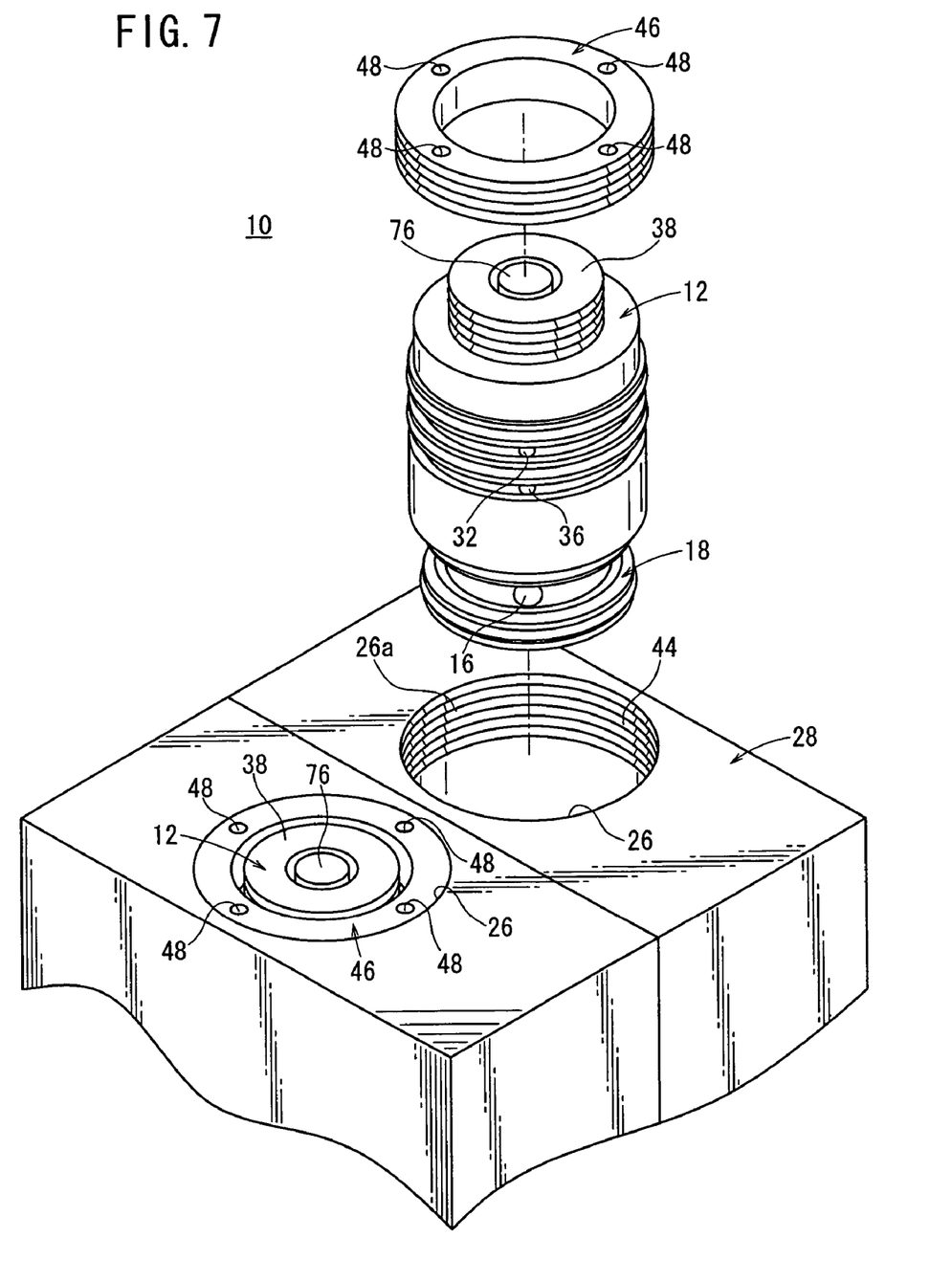
FIG. 7 is, with partial omission, a perspective view illustrating an assembling state in which the paint selector valve shown in FIG. 1 is disengaged from a manifold.
Figure 8:
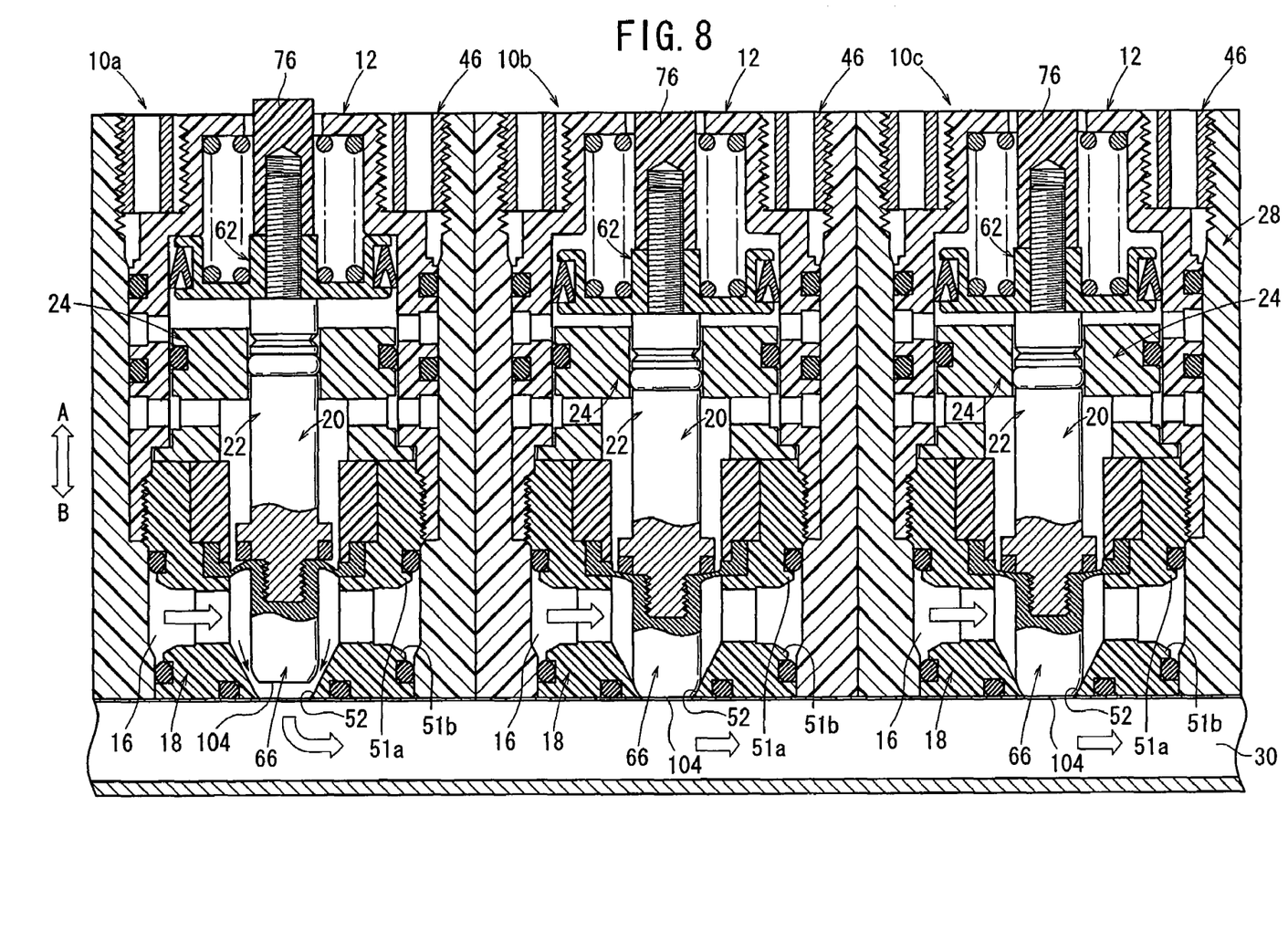
FIG. 8 is, with partial omission, a vertical sectional view illustrating a state in which a plurality of the paint selector valves are installed to the manifold.

As shown in FIGS. 1 and 2, the paint selector valve 10 comprises a main body (valve body) 12 which is formed to be substantially cylindrical, a sub-body (valve body) 18 which is connected on a side of an open one end of the main body 12 and which has a supply port (port) 16 for supplying a pressure fluid such as a paint thereto, a valve mechanism section 20 which is displaceable in an axial direction in the main body 12 and the sub-body 18, and a guide body (valve body) 24 which is provided in the main body 12 and which supports a shaft 22 of the valve mechanism section 20 in the axial direction. As shown in FIGS. 7 and 8, the paint selector valves 10 are installed to a manifold 28 by the aid of a plurality of (for example, three) installation holes 26 and the sub-bodies 18 are opposed to a fluid passage 30 through which the paint flows (see FIG. 8).

A thread is engraved on the inner circumferential surface at one end of the main body 12, and a portion of the sub-body 18 is screwed therewith.

A pilot port 32, which is to be connected to an unillustrated pressure fluid supply source, is formed by an annular groove on the outer circumferential surface of the main body 12. The pressure fluid (for example, compressed air), which serves as the pilot air, is supplied from the pilot port 32 to the interior of the main body 12. A pair of seal members 34, which are separated from the pilot port 32 by predetermined spacing distances in the axial direction (directions of the arrows A and B), are installed to the outer circumferential surface of the main body 12. Accordingly, when the paint selector valve 10 is installed to the manifold 28, the annular seal members 34 abut against the inner wall surface of the installation hole 26 of the manifold 28 to retain air tightness of the pressure fluid to be supplied to the pilot port 32.

A detection port 36, which communicates with the interior of the main body 12, is formed on the outer circumferential surface of the main body 12 while being separated by a predetermined spacing distance from the pilot port 32 in the axial direction (direction of the arrow B) of the main body 12. An unillustrated detection sensor (for example, a pressure sensor) is connected to the detection port 36, for example, via a piping connected to the detection port 36. The pressure change is detected by the detection sensor, and thus it is possible to detect the leakage of the pressure fluid from the interior of the main body 12. The pilot port 32 and the detection port 36 are formed to be annular along the outer circumferential surface of the main body 12 respectively.

On the other hand, a diametrally reduced section 38, which has a diameter reduced radially inwardly as compared with one end side, is formed at the other end of the main body 12. A through-hole 40 is formed at a substantially central portion of the diametrally reduced section 38. Further, a thread is engraved on the outer circumferential surface of the diametrally reduced section 38.

When the paint selector valve 10 is inserted into the installation hole 26 of the manifold 28, a ring member 46 is screwed with a screw section 44 formed at the opening 26a of the installation hole 26. That is, when the ring member 46 is screwed and displaced toward the sub-body 18 (in the direction of the arrow B), then the other end of the main body 12 is pressed by the ring member 46, and the paint selector valve 10, which includes the main body 12, is fixed in the installation hole 26 of the manifold 28. A plurality of jig holes 48, which penetrate in the axial direction, are formed through the ring member 46 while being separated from each other by predetermined spacing distances in the circumferential direction.

The supply port 16 of the sub-body 18 is formed annularly along the outer circumferential surface of the sub-body 18. The supply port 16 communicates with a supply chamber 50 which is formed in the sub-body 18. A pair of seal members 34a, 34b are installed on both sides in the axial direction (directions of the arrows A and B) of the supply port 16 on the outer circumferential surface of the sub-body 18. Accordingly, when the paint selector valve 10 is installed to the manifold 28, the seal members 34a, 34b abut against the inner wall surface of the installation hole 26 of the manifold 28 to retain air tightness of the supply port 16.

That is, when the paint is supplied to the supply port 16 via an unillustrated passage formed in the manifold 28, the paint does not leak from gaps between the sub-body 18 and the installation hole 26 of the manifold 28.

The seal members 34a, 34b are installed to a pair of installation grooves 42a, 42b which are formed annularly along the outer circumferential surface of the sub-body 18. The installation grooves 42a, 42b have wall sections 51a, 51b, each of which is formed on the side of one side surface facing the supply port 16 so that the wall sections 51a, 51b are open to make communication with the supply port 16 respectively. In other words, the one side surface of the installation grooves 42a, 42b is separated by a predetermined spacing distance from the inner wall surface of the installation hole 26 into which the sub-body 18 is inserted. On the other hand, the other side surface, which is opposed to the wall sections 51a, 51b with the seal members 34a, 34b interposed therebetween, is formed to make abutment against the inner wall surface of the installation hole 26 to effect the closing.

For example, when the paint, which is supplied to the paint selector valve 10, is changed into another paint having a different paint color, the interior of the supply chamber 50 and the supply port 16 of the sub-body 18 is washed.

In this situation, in the conventional paint selector valve, the wall section of the groove, to which the seal member is installed as described above, is formed to make abutment against the inner wall surface of the manifold. Therefore, it is difficult to reliably remove, by washing, the paint which has entered the interior of the groove through the gap between the manifold and the wall section of the groove. As a result, when the paint having another paint color is supplied to the paint selector valve after completing the washing of the paint in the casing, it is feared that the paints having the different paint colors may be mixed with each other.

According to the present invention, however, the wall sections 51a, 51b of the installation grooves 42a, 42b opposed to the supply port 16 are formed so that they are open, when liquid pool is formed between the supply port 16 and the seal members 34a, 34b installed to the installation grooves 42a, 42b. Therefore, the washing liquid, which is used to perform the washing, enters the deep portions of the installation grooves 42a, 42b from the open portions. Accordingly, any remaining paint can be removed reliably and appropriately.

As a result, the previous paint does not remain in the paint selector valve 10 after washing the paint in the sub-body 18. Therefore, when another paint having a different paint color is supplied, the paints having the different paint colors are not mixed with each other.

Figure 3:
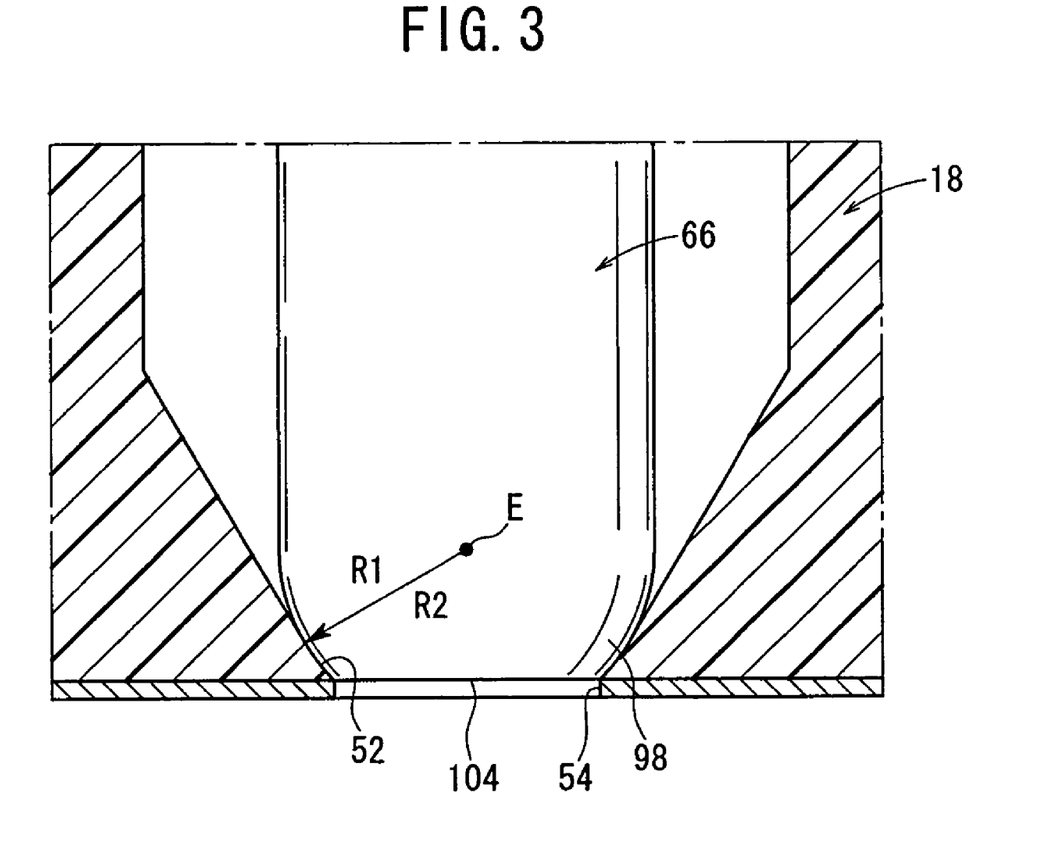
FIG. 3 is a magnified vertical sectional view illustrating those disposed in the vicinity of a valve seat section and a seating section of a valve plug in the state shown in FIG. 1.
Figure 4:
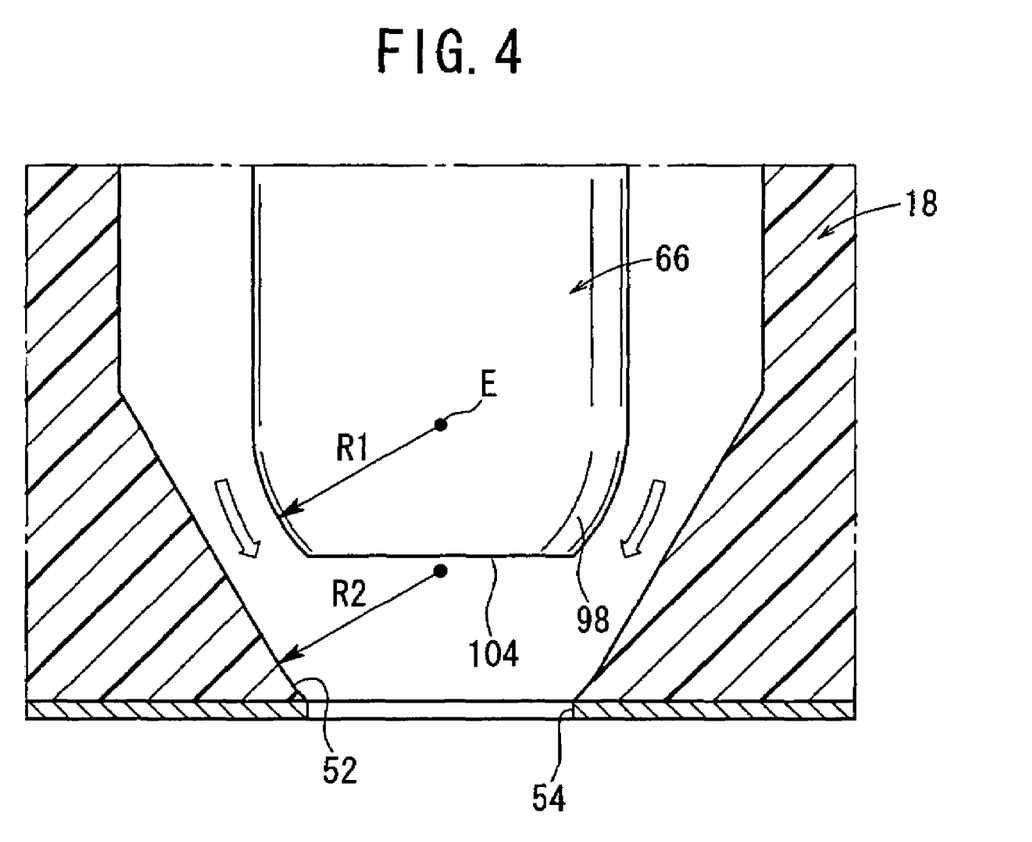
FIG. 4 is a magnified vertical sectional view illustrating those disposed in the vicinity of the valve seat section and the seating section of the valve plug in the state shown in FIG. 2.

Further, a valve seat section 52, which has diameters gradually reduced in the direction (direction of the arrow B) to make separation from the supply chamber 50 and on which a valve plug 66 of the valve mechanism section 20 is to be seated, is formed in the sub-body 18. As shown in FIGS. 3 and 4, the valve seat section 52 is formed to be substantially spherical so that the surface thereof is recessed or concave while being opposed to the valve plug 66. A communication hole 54, which makes communication with the valve seat section 52, is formed on the inner wall surface of the fluid passage 30 facing the valve seat section 52 while being connected to the sub-body 18. Accordingly, a state is given (see FIGS. 2 and 4), in which the fluid passage 30 is communicated with the supply chamber 50 and the supply port 16 of the sub-body 18 in the valve-open state (see FIG. 4) in which the valve plug 66 is separated from the valve seat section 52.

A seal member 34 is installed to an annular groove on a connecting surface 56 of the sub-body 18 with respect to the fluid passage 30. Therefore, the paint, which flows from the sub-body 18 to the fluid passage 30 via the communication hole 54, is prevented from leaking.

As shown in FIGS. 1 and 2, the guide body 24 is provided so that the outer circumferential surface thereof is opposed to the inner circumferential surface of the main body 12. A part of the guide body 24 is interposed between one end of the main body 12 and the sub-body 18, and thus the guide body 24 is fixed to the main body 12 and the sub-body 18.

A clearance is formed to provide a predetermined spacing distance between the outer circumferential surface of the guide body 24 and the inner wall surface of the main body 12. Further, the seal member 34 is installed to the annular groove on the outer circumferential surface. Air tightness is retained by the seal member 34 between the guide body 24 and the main body 12. A shaft hole (hole) 58, into which the shaft 22 of the valve mechanism section 20 is inserted, is formed on the inner circumferential surface of the guide body 24.

In particular, a clearance, which provides a predetermined spacing distance, is formed between the outer circumferential surface of the shaft 22 and the inner circumferential surface of the shaft hole 58.

Further, the guide body 24 has a communication passage 60 which is formed at a position opposed to the detection port 36 of the sub-body 18 while being substantially perpendicular to the axis. The communication passage 60 is composed of an annular section which is formed annularly in the circumferential direction of the guide body 24, and a plurality of communicating sections to make communication between the annular section and the interior of the guide body 24.

The valve mechanism section 20 comprises a piston 62 which is arranged displaceably in the axial direction (directions of the arrows A and B) in the main body 12, the shaft 22 which is connected to the piston 62, the valve plug 66 which is connected to the end of the shaft 22, and first and second springs 68a, 68b which are interposed between the piston 62 and the main body 12. The first and second springs 68a, 68b are provided between the inner wall surface of the main body 12 on the side of the other end and a recess 62a of the piston 62. The resilient forces of the first and second springs 68a, 68b urge the piston 62 toward the guide body 24 (in the direction of the arrow B).

The first spring 68a is arranged radially inwardly in the recess 62a at the position close to the shaft 22. Further, the second spring 68b is arranged radially outwardly with respect to the first spring 68a.

The shaft 22 is inserted into a through-hole 70 formed at a substantially central portion of the piston 62. The piston 62 is fastened by a step 72 of the shaft 22. Further, a columnar fixing member 76 is screwed with a screw section 74 formed at one end of the shaft 22 after inserting the piston 62. Accordingly, the piston 62 is integrally fixed to the shaft 22.

The fixing member 76 is formed to have an outer circumferential diameter which is smaller than the diameter of the through-hole 40 of the main body 12. Therefore, as shown in FIG. 2, the end surface of the fixing member 76 is inserted into the through-hole 40 to protrude by a predetermined length in the direction of the arrow A from the outer wall surface of the main body 12 in the valve-open state in which the valve mechanism section 20 is separated from the valve seat section 52. On the other hand, as shown in FIG. 1, when the valve mechanism section 20 is in the valve-closed state, the end surface of the fixing member 76 does not protrude from the outer wall surface of the main body 12 while being inserted into the through-hole 40.

That is, the fixing member 76 functions to serve as a changeover-indicating mechanism (indicator) which makes it possible to visually recognize the valve-open state and the valve-closed state by the valve mechanism section 20 conveniently by confirming the position of the end surface of the fixing member 76 with respect to the outer wall surface of the main body 12.

On the other hand, a piston packing 78, which is composed of an elastic material having a substantially V-shaped cross section, is installed to an annular groove on the outer circumferential surface of the piston 62. The piston 62 is displaced in the axial direction (directions of the arrows A and B) while allowing the piston packing 78 to slide along the inner circumferential surface of the main body 12. Therefore, the piston packing 78 reliably retains air tightness of the interior of a cylinder chamber 80 formed by the piston 62, the guide body 24, and the inner circumferential surface of the main body 12. That is, the pressure fluid, which is supplied from the pilot port 32 to the cylinder chamber 80, does not leak, and the pressure fluid is retained in the cylinder chamber 80.

A charging groove 82, which is to be filled with a lubricant such as grease, is formed while being recessed by a predetermined depth on the outer circumferential surface of a main body section 22a of the shaft 22 retained by the guide body 24. Further, an annular shaft seal 84 is installed while being separated by a predetermined spacing distance from the charging groove 82 in the axial direction. That is, when the shaft 22 is displaced in the axial direction along the shaft hole 58, the sliding resistance can be mitigated between the shaft 22 and the shaft hole 58 by the lubricant which fills the charging groove 82 to smoothly effect the displacement. Accordingly, abrasion is mitigated when the shaft 22 is displaced. Therefore, it is possible to improve the durability of the shaft 22. Further, it is possible to retain air tightness between the shaft 22 and the shaft hole 58 by means of the shaft seal 84.

In other words, the shaft 22 and the shaft hole 58 basically make contact with each other merely by the aid of the shaft seal 84, because a slight clearance is formed between the outer circumferential surface of the shaft 22 and the inner circumferential surface of the shaft hole 58.

The other end of the shaft 22 is arranged in the sub-body 18. An annular flange section 86, which is radially expanded outwardly from the main body section 22a, is formed. An elastic member 88, which is composed of a resin material, is installed to an annular groove at the end surface of the flange section 86 opposed to the valve plug 66. That is, the elastic member 88 is installed to the flange section 86 of the shaft 22 against which a diaphragm section 96 of the valve plug 66 makes abutment, and thus it is possible to mitigate the load exerted from the shaft 22 on the diaphragm section 96 composed of a resin material. As a result, it is possible to improve the durability of the diaphragm section 96 of the valve plug 66.

The valve plug 66 is formed of a resin material and has a substantially columnar shape. A screw-engaging section 92 of the shaft 22 is screwed with a screw hole 90 which is formed on one end side of the valve plug 66. The diaphragm section 96, which has an outer edge section 94 formed at the circumferential edge in the radially outward direction and which is to be fixed to the sub-body 18, is formed at one end of the valve plug 66. Further, a seating section 98, which is to be seated on the valve seat section 52 of the sub-body 18, is formed on the other end side.

The diaphragm section 96 has a thin film-shaped skirt 100 which is formed between one end of the valve plug 66 and the outer edge section 94. The skirt 100 abuts against the elastic member 88 installed to the shaft 22. The skirt 100 is flexibly bendable about the support point of the connecting portion with respect to the outer edge section 94 under the displacement action of the valve plug 66 in the axial direction (directions of the arrows A and B). The outer edge section 94 is interposed between the sub-body 18 and a cylindrical holding member 102 provided in the sub-body 18.

That is, the diaphragm section 96 blocks the communication between the interior of the main body 12 and the interior of the supply chamber 50 of the sub-body 18. Therefore, the paint, which is supplied from the supply port 16 to the supply chamber 50, is prevented from invading into the interior of the main body 12 and the guide body 24 by the diaphragm section 96 of the valve plug 66.

In other words, when malfunction occurs in the diaphragm section 96 due to any cause, and the paint, which is supplied into the sub-body 18, enters the interior of the guide body 24, then the pressure in the guide body 24 is increased. Therefore, the increase in the pressure is detected by the detection sensor (not shown) via the communication passage 60 and the detection port 36, and it is possible to confirm the leakage of the paint.

As shown in FIGS. 3 and 4, the seating section 98 of the valve plug 66 is formed so that the outer circumferential surface of the forward end portion is formed to be substantially spherical to make abutment by being seated on the valve seat section 52. The radius R1 of the seating section 98 is formed to be substantially equivalent to the radius R2 of the surface of the valve seat section 52 formed to be substantially spherical (R1≈R2). Therefore, when the seating section 98 of the valve plug 66 is seated on the valve seat section 52 which is formed to be substantially spherical, it is possible to establish a state in which the outer circumferential surface of the seating section 98 and the surface of the valve seat section 52 make tight contact with each other (see FIG. 3).

Further, the seating section 98 is formed so that the forward end surface 104, which faces the communication hole 54 of the fluid passage 30, is planar while being substantially perpendicular to the axis of the valve plug 66. As shown in FIG. 3, the forward end surface 104 is provided so that the forward end surface 104 is substantially flush with the connecting surface 56 with respect to the fluid passage 30 of the sub-body 18 when the valve plug 66 is seated on the valve seat section 52 to give the valve-closed state.

Figure 6:
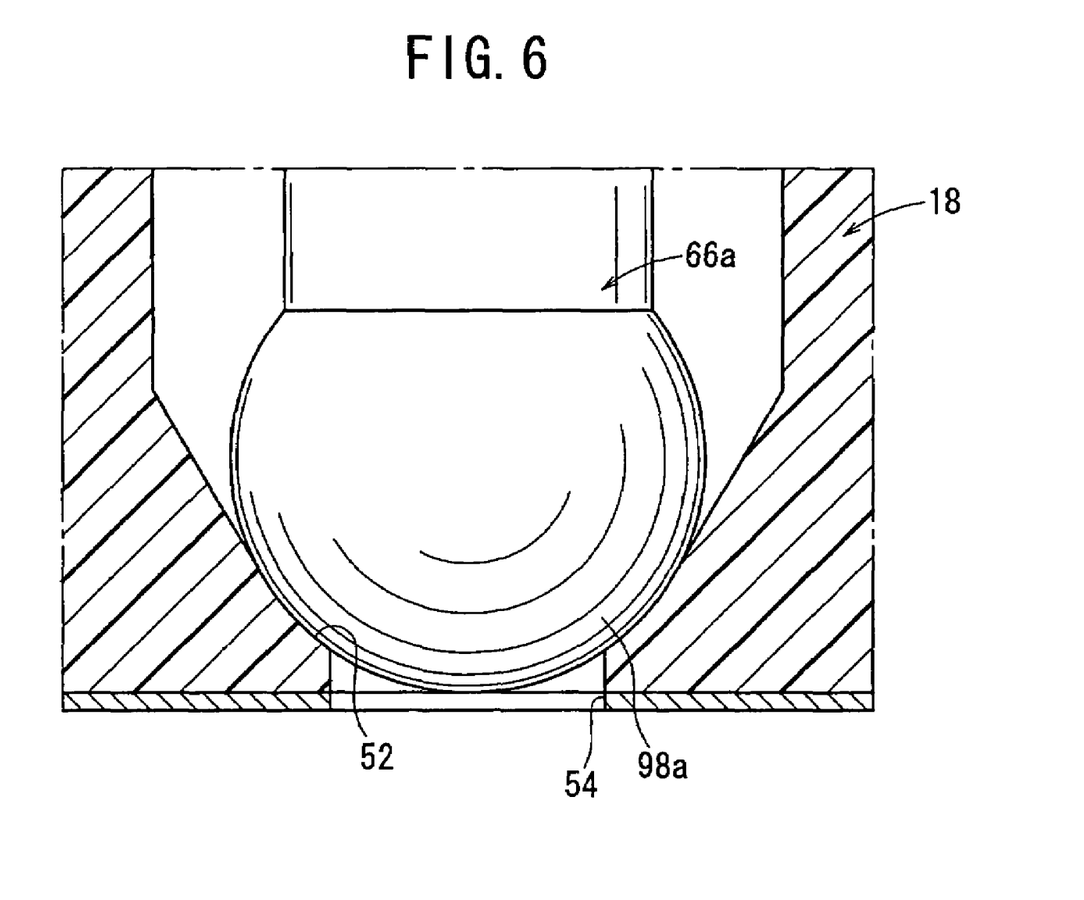
FIG. 6 is a magnified vertical sectional view illustrating a valve seat section and a seating section of a valve plug to depict a modified embodiment of the seating section of the valve plug.

The seating section 98 is not limited to such an arrangement that the forward end surface 104 is formed to be planar while being substantially in parallel to the connecting surface 56, and the outer circumferential surface thereof is formed to be substantially spherical as described above. Alternatively, as shown in FIG. 6, a seating section 98a may be formed to be substantially spherical as a whole. Accordingly, the valve plug 66 can be appropriately seated on the valve seat section 52 which is formed to be substantially spherical.

The paint selector valve 10 according to the first embodiment of the present invention is basically constructed as described above. Next, its operation, function, and effect will be explained.

At first, an explanation will be made about a procedure in which the paint selector valve 10 is assembled to the manifold 28. Initially, starting from a state in which the paint selector valve 10 and the ring member 46 are disengaged from the installation hole 26 of the manifold 28 shown in FIG. 7, the paint selector valve 10 is inserted into the installation hole 26 so that the valve plug 66 is disposed downwardly. After that, the ring member 46 is inserted from the opening 26a of the installation hole 26, and the ring member 46 is screwed with the screw section 44 formed on the installation hole 26. Finally, an unillustrated jig is inserted into the four jig holes 48 formed at the upper surface of the ring member 46. The ring member 46 is rotated by the aid of the jig, and thus the ring member 46 is displaced toward the paint selector valve 10 (in the direction of the arrow B). As shown in FIGS. 1 and 2, the ring member 46 is allowed to abut against the upper surface of the main body 12, and thus the paint selector valve 10 is integrally installed to the manifold 28.

On the other hand, when the paint selector valve 10, which is installed to the manifold 28, is disengaged from the installation hole 26, then the unillustrated jig is used to rotate the ring member 46 in a direction opposite to the above, and thus the ring member 46 is displaced in the direction (direction of the arrow A) to make separation from the main body 12. After the ring member 46 is disengaged from the installation hole 26, the paint selector valve 10 can be conveniently taken out from the installation hole 26.

As described above, the paint selector valve 10 can be conveniently installed to and disengaged from the manifold 28 by attaching and detaching the ring member 46 used to fix the paint selector valve 10 to the installation hole 26 of the manifold 28. Accordingly, it is possible to improve the efficiency, for example, in the maintenance operation including the exchange of the paint selector valve 10 with respect to the manifold 28.

Next, the operation, function, and effect of the paint selector valve 10 installed to the manifold 28 as described above will be explained. An explanation will be made assuming that the initial state resides in the state shown in FIG. 1 wherein the paint, which is supplied from the supply port 16 into the supply chamber 50, is blocked for the flow to the fluid passage 30 by the valve plug 66 seated on the valve seat section 52.

At first, the pressure fluid (for example, compressed air) is supplied from the unillustrated pressure fluid supply source to the pilot port 32, and thus the pressure fluid, which is supplied to the pilot port 32, is introduced into the cylinder chamber 80. The piston 62 is displaced in the direction (direction of the arrow A) to make separation from the guide body 24 against the resilient force of the first and second springs 68a, 68b.

As shown in FIG. 2, the shaft 22, which is connected to the piston 62, is displaced, and the valve plug 66 is separated from the valve seat section 52. The paint, which has been supplied from the unillustrated paint supply source to the supply port 16, flows from the supply chamber 50 through the space between the valve seat section 52 and the valve plug 66. The paint is supplied from the communication hole 54 to the fluid passage 30. The paint, which is supplied to the fluid passage 30, is sprayed from the unillustrated nozzle connected to the fluid passage 30 to paint, for example, the body of the vehicle such as an automobile.

On the other hand, when the supply of the paint to the fluid passage 30 is stopped, the supply of the pressure fluid supplied from the unillustrated pressure fluid supply source to the pilot port 32 is stopped. Accordingly, the piston 62 is pressed toward the guide body 24 (direction of the arrow B) by the resilient force of the first and second springs 68a, 68b. The shaft 22 is integrally displaced in the direction of the arrow B in accordance with the displacement of the piston 62. Therefore, the valve plug 66, which is connected to the shaft 22, is seated on the valve seat section 52 of the sub-body 18 to block the communication between the supply port 16 and the fluid passage 30 in the paint selector valve 10. As a result, the paint, which is supplied to the supply port 16, is prevented from flowing to the fluid passage 30 by means of the valve plug 66 to the initial state in which the flow of the paint to the fluid passage 30 is stopped.

In this arrangement, the surface of the valve seat section 52 of the sub-body 18 is formed to have the substantially spherical shape which is recessed in the concave form, and the outer circumferential surface of the seating section 98 of the valve plug 66 is formed to have the substantially spherical shape. Therefore, the valve plug 66 and the valve seat section 52 effect the seating while making tight contact with each other with the substantially spherical surfaces. As a result, the state is given, in which the valve plug 66 and the valve seat section 52 always make tight contact with each other. The valve seat section 52 can be reliably sealed by the valve plug 66. Accordingly, it is possible to improve the sealing performance of the valve seat section 52 by the valve plug 66. Therefore, it is possible to reliably block the communication of the paint.

Further, it is possible to suppress any uneven abrasion which would otherwise be caused by the contact between the valve plug 66 and the valve seat section 52, because the outer circumferential surface of the seating section 98 of the valve plug 66 is formed to have the substantially spherical shape. Thus, it is possible to improve the durability of the valve plug 66 and the valve seat section 52.

Figure 5:
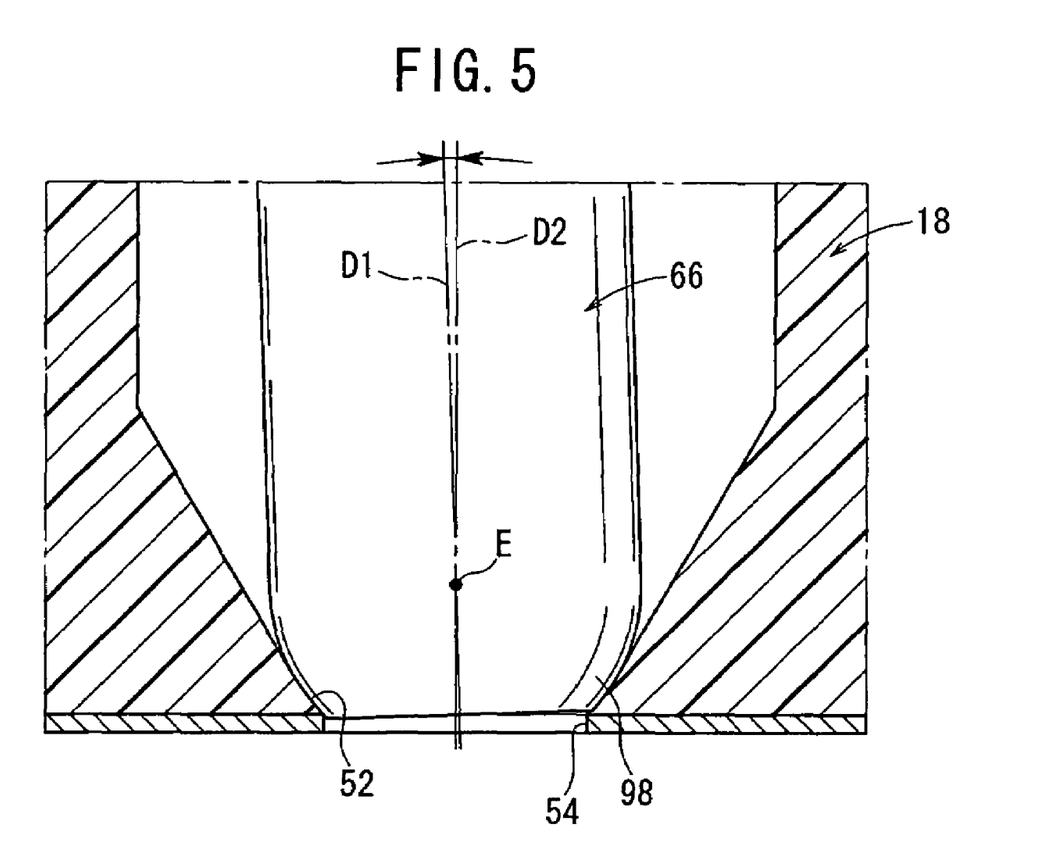
FIG. 5 is a magnified vertical sectional view illustrating a state in which the valve plug shown in FIG. 3 is seated on the valve seat section while the axial center of the valve plug shown in FIG. 3 is inclined by a predetermined angle.

On the other hand, as shown in FIG. 5, for example, when the dimensions of the constitutive parts of the valve mechanism section 20 including the valve plug 66 are dispersed, the axial center is deviated in some cases, in which the axis D1 of the shaft 22 and the valve plug 66 is slightly inclined in the radial direction with respect to the axis D2 of the sub-body 18 including the valve seat section 52. In such a situation, in the conventional paint selector valve, when the valve section is displaced in the axial direction to be seated on the valve seat member, a slight gap is left between the valve section and the valve seat member due to the deviation of the axial center of the valve section. For this reason, it is feared that the sealing performance for the valve seat member to be effected by the valve section may be unstable, and the paint may leak through the gap.

According to the paint selector valve 10 of the present invention, the shaft 22 can be swingably displaced by a small amount in the radial direction, because the shaft 22, to which the valve plug 66 is connected, is supported while providing the clearance in the radial direction with respect to the shaft hole 58 of the guide body 24. Simultaneously, the clearance is also provided in the radial direction between the inner wall surface of the main body 12 and the piston 62 connected to the end of the shaft 22 to effect the support by allowing the piston packing 78 to abut against the inner wall surface of the main body 12.

That is, the valve seat section 52 is formed to have a tapered shape with the diameter thereof gradually reduced toward the communication hole 54. Therefore, when the shaft 22, which includes the valve plug 66 with the deviated axial center in the radial direction, is to be seated on the valve seat section 52, then the valve plug 66 and the shaft 22 make the swinging movement about the support point of the center E (see FIGS. 3 and 4) of the seating section 98 formed to have the substantially spherical shape, and the displacement is effected while gradually causing the sliding movement toward the substantially central portion of the valve seat section 52 opposed to the communication hole 54 along the tapered valve seat section 52. In other words, the shaft 22 is almost forcibly displaced and swung by the tapered valve seat section 52 so that the angle of the relative inclination of the axis of the shaft 22 is decreased with respect to the axis of the sub-body 18 including the valve seat section 52.

As described above, the swinging displacement of the shaft 22, which is caused upon the seating on the valve seat section 52, is appropriately absorbed by the clearance formed between the shaft 22 and the guide body 24, the clearance formed between the piston 62 and the inner wall surface of the main body 12, and the elastic member 88 and the thin-walled diaphragm section 96 formed at the end of the valve plug 66. As a result, even when the axial center of the shaft 22 and the valve plug 66 is deviated with respect to the axis of the main body 12 and the sub-body 18, then the valve plug 66, of which axial center is deviated, is swingably displaced, and thus the valve plug 66 can be seated on the valve seat section 52 reliably and appropriately.

In this arrangement, the seating section 98 of the valve plug 66 and the valve seat section 52 are formed to be substantially spherical respectively. Therefore, even when the axial center is slightly deviated in the radial direction when the valve plug 66 is seated on the valve seat section 52, the outer circumferential surface of the seating section 98 can be constantly seated on the surface of the valve seat section 52 in the tight contact state. Therefore, it is possible to constantly obtain stable sealing performance by the valve plug 66.

Further, the forward end surface 104 of the seating section 98 of the valve plug 66 is planar, and the forward end surface 104 is substantially flush with the connecting surface 56 of the sub-body 18 when the valve plug 66 is seated on the valve seat section 52. Accordingly, the paint, which flows from the valve seat section 52 of the sub-body 18 to the communication hole 54, is prevented from remaining as liquid pool between the communication hole 54 and the forward end surface 104. Further, the paint, which flows through the fluid passage 30 from the upstream side of the fluid passage 30 provided with the paint selector valve 10, can be suppressed from remaining between the communication hole 54 and the forward end surface 104 of the valve plug 66.

Further, when the forward end surface 104 of the valve plug 66, with which the paint flowing through the fluid passage 30 makes contact, is formed to be planar, the valve plug 66 is prevented from causing any flow passage resistance during the flow of the paint. As a result, it is possible to suppress liquid pool of the paint which would be otherwise generated between the seating section 98 of the valve plug 66 of the paint selector valve 10 and the communication hole 54 of the fluid passage 30.

Next, an explanation will be made about a plurality of (for example, three) first to third paint selector valves 10a to 10c which are installed to the manifold 28 substantially parallel to each other as shown in FIG. 8. The first to third paint selector valves 10a to 10c, which are provided as three parts on the manifold 28, are arranged such that the first paint selector valve 10a, which is provided in the installation hole 26 disposed on the leftmost side, is in the valve-open state, and the remaining second and third paint selector valves 10b, 10c are in the valve-closed state.

At first, the paint is supplied from the unillustrated paint supply source via the first paint selector valve 10a to the fluid passage 30. At this time, the second and third paint selector valves 10b, 10c are in the valve-closed state respectively. Therefore, the paint, which flows through the fluid passage 30, does not enter the interior of the second and third paint selector valves 10b, 10c.

Since the difference in level is small between the inner wall surface of the fluid passage 30 and the forward end surface 104 of the valve plug 66 of each of the second and third paint selector valves 10b, 10c, there is no flow passage resistance when the paint flows. Further, liquid pool of the paint is prevented from remaining between the forward end surface 104 and the communication hole 54 formed for the fluid passage 30.

The paint, which is supplied from the first paint selector valve 10a to the fluid passage 30, is sprayed from the nozzle (not shown) connected to the fluid passage 30 to paint the body of the vehicle as the painting objective with a desired paint color.

Next, an explanation will be made about how the body (not shown) is painted with another paint having a different color from that of the paint supplied to the first paint selector valve 10. In this case, the first paint selector valve 10a is in the valve-closed state to cut off the supply of the paint supplied to the fluid passage 30 via the first paint selector valve 10a. The interior of the fluid passage 30 is washed, because the paint, which has been supplied from the first paint selector valve 10a, is adhered to the fluid passage 30. In this situation, all of the first to third paint selector valves 10a to 10c are in the valve-closed state.

In this arrangement, the forward end surface 104 of the valve plug 66 of each of the first to third paint selector valves 10a to 10c is formed to be substantially planar, and the spacing distance between the forward end surface 104 and the inner wall surface of the fluid passage 30 is small. Therefore, the liquid pool of the paint is prevented from generating between the fluid passage 30 and the forward end surface 104 of the valve plug 66. Accordingly, when the interior of the fluid passage 30 is washed, the liquid pool of the paint, which is formed between the valve plug 66 and the fluid passage 30, can be removed conveniently and reliably, for example, with a washing liquid.

As a result, the paint, which has been supplied from the first paint selector valve 10a, can be prevented from remaining in the fluid passage 30. When the paint, which has a different color from that of the former paint, is supplied from the second or third paint selector valve 10b, 10c to the fluid passage 30, it is possible to avoid the mixing of the paints having different colors.

After the paint contained in the fluid passage 30 has been washed as described above, for example, the second paint selector valve 10b is allowed to be in the valve-open state under the action of the supply of the pressure fluid. Accordingly, the valve plug 66 of the second paint selector valve 10b is separated from the valve seat section 52, and the paint, which has a different color from the former, is supplied from the supply port 16 via the communication hole 54 to the fluid passage 30. In this situation, the first and third paint selector valves 10a, 10c are in the valve-closed state respectively.

As described above, the plurality of first to third paint selector valves 10a to 10c are provided integrally with respect to the manifold 28, and the first to third paint selector valves 10a to 10c, which are connected to the paint supply sections stored with the paints having different colors, are arbitrarily switched. Accordingly, the paints of the plurality of paint colors can be supplied individually and independently from the single fluid passage 30 to the unillustrated nozzle respectively. Accordingly, it is unnecessary to provide a plurality of coating apparatus including nozzles and a plurality of fluid passages having been hitherto provided for the respective paints having different paint colors. Thus, it is possible to reduce the equipment cost and save installation space.

It is possible to suppress the liquid pool generated between the communication hole 54 of the fluid passage 30 and the valve plug 66 of each of the first to third paint selector valves 10a to 10c. Accordingly, the paint, which remains in the fluid passage 30, can be washed and removed reliably and conveniently. Therefore, it is possible to reliably avoid the mixing of the paints having different colors in the fluid passage 30. Further, it is unnecessary to perform complicated operations which would be otherwise performed such as increasing the number of washing operations for the fluid passage 30 in order to remove the paint remaining therein.

Figure 9:
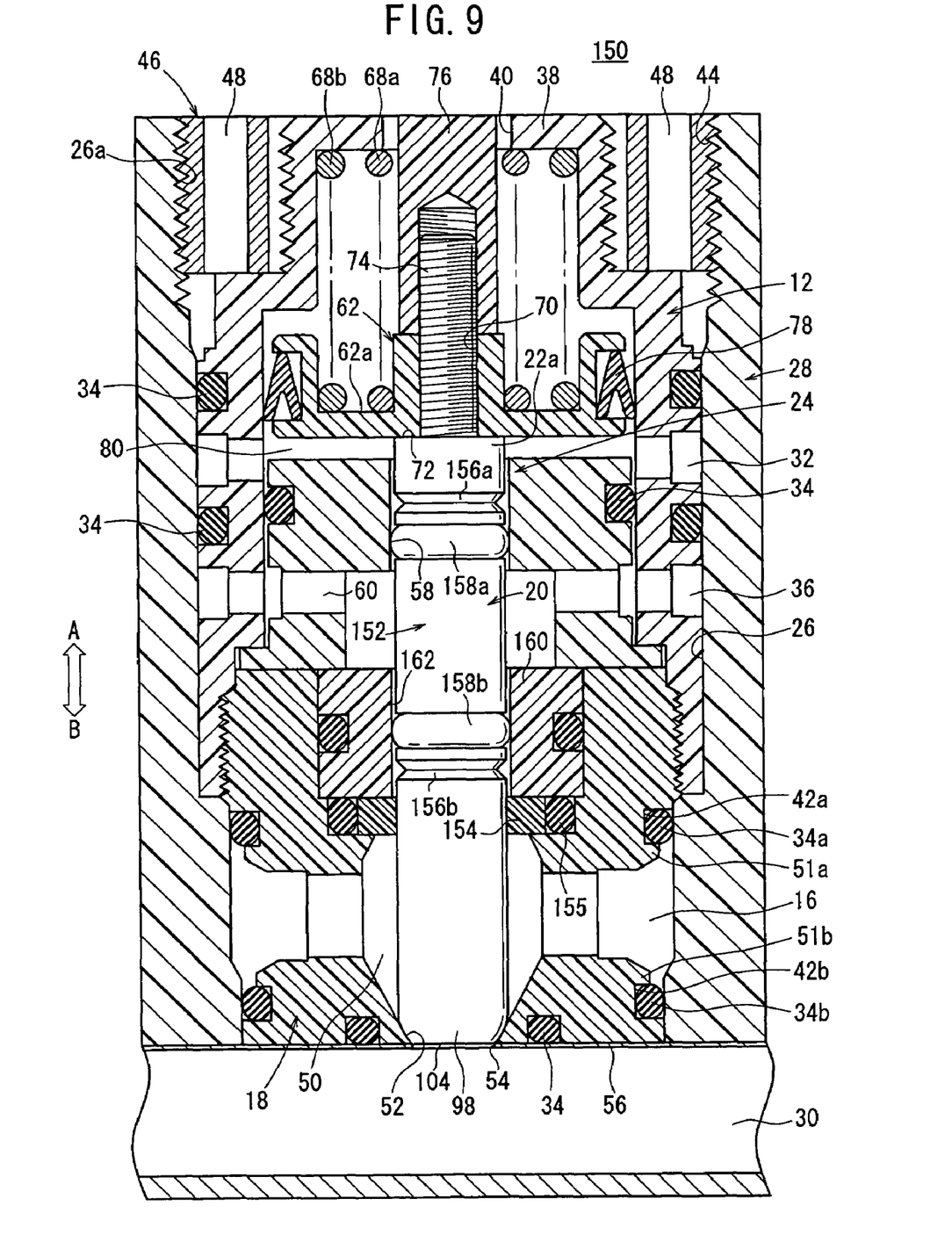
FIG. 9 is a vertical sectional view illustrating a paint selector valve according to a second embodiment.

Next, a paint selector valve 150 according to a second embodiment is shown in FIG. 9. The same constitutive components as those of the paint selector valve 10 according to the first embodiment described above are designated by the same reference numerals, any detailed explanation of which will be omitted.

The paint selector valve 150 according to the second embodiment is different from the paint selector valve 10 according to the first embodiment in that the seating section 98 is formed integrally with a shaft 152, and the outer circumferential surface of the shaft 152 is surrounded by a packing 154 provided in the sub-body 18 to retain air tightness in the supply chamber 50.

The paint selector valve 150 has the shaft 152 which is formed of a metal material such as stainless steel. A pair of charging grooves 156a, 156b, to which a lubricant such as grease is to be charged, is formed on the outer circumferential surface while being separated from each other by a predetermined spacing distance. A pair of shaft seals 158a, 158b are installed, which are separated from the charging grooves 156a, 156b by predetermined spacing distances respectively.

The charging groove 156a and the shaft seal 158a, which are disposed on one side, are provided at positions opposed to the shaft hole 58 of the guide body 24. The charging groove 156b and the shaft seal 158b, which are disposed on the other side, are provided at positions opposed to a retaining hole 162 of a cylindrical retaining member 160 provided in the sub-body 18.

The packing 154, which surrounds the outer circumferential surface of the shaft 152, is installed between the end surface of the retaining member 160 and the sub-body 18. An annular seal member 155 is arranged on the outer circumferential surface of the packing 154.

Since the paint selector valve according to the second embodiment is constructed as described above, the shaft 152 is displaced integrally under the displacement action of the piston 62 in the axial direction. The seating section 98, which is formed at the end of the shaft 152, is seated on and separated from the valve seat section 52 of the sub-body 18, and thus the communication state is switched with respect to the fluid passage 30 through which the paint flows. In this arrangement, air tightness is reliably retained for the supply chamber 50 of the sub-body 18 to which the paint is supplied, by means of the packing 154 which is installed to the inner circumferential surface of the sub-body 18 and which surrounds the outer circumferential surface of the shaft 152.

Even when the shaft 152 is slightly displaced in the radial direction, the displacement can be absorbed by the packing 154 which surrounds the outer circumferential surface of the shaft 152 and the seal member 155 which surrounds the packing 154.

As described above, in the case of the paint selector valve 150, the shaft 152, which has the seating section 98, can be integrally formed of the metal material. This is advantageous in that the cost can be reduced.

Further, it is possible to improve the rigidity of the seating section 98, because the seating section 98, which is to be seated on the valve seat section 52 of the sub-body 18, is formed of the metal material, as compared with the paint selector valve 10 in which the valve plug 66 having the seating section 98 is formed of the resin material.

Figure 10:
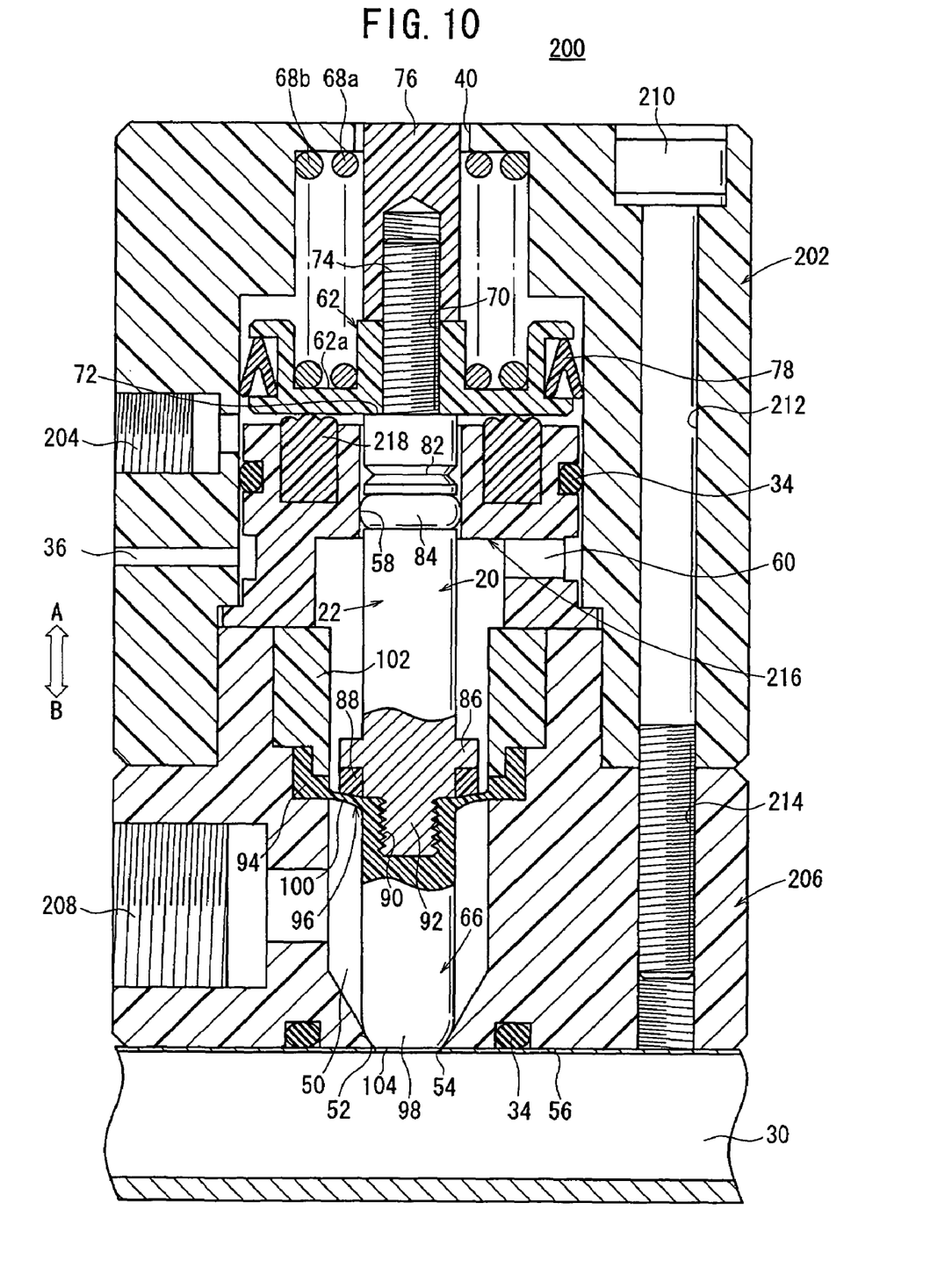
FIG. 10 is a vertical sectional view illustrating a paint selector valve according to a third embodiment.

Next, a paint selector valve 200 according to a third embodiment is shown in FIG. 10. The same constitutive components as those of the paint selector valves 10, 150 according to the first and second embodiments described above are designated by the same reference numerals, any detailed explanation of which will be omitted.

The paint selector valve 200 according to the third embodiment is different from the paint selector valves 10, 150 according to the first and second embodiments in that a pilot port 204 and a supply port 208 are not formed annularly with respect to a main body 202 and a sub-body 206 respectively, the main body 202 and the sub-body 206 are integrally connected to one another by the aid of a lengthy bolt 210, and the paint selector valve 200, which includes the main body 202 and the sub-body 206, is not installed to the manifold 28.

In the case of the paint selector valve 200, a through-hole 212, which penetrates in the axial direction of the main body 202, is formed. Further, a part of the sub-body 206 is inserted on one end side of the main body 202. A screw hole 214, on which a thread is engraved, is formed on the sub-body 206 at a position opposed to the through-hole 212 of the main body 12. The bolt 210, which is inserted into the through-hole 212, is screwed therewith. Accordingly, the main body 12 and the sub-body 206 are integrally connected to one another.

A buffer member 218 is installed to a guide body 216 for retaining the shaft 22 by the aid of an annular groove disposed on the end surface opposed to the piston 62. The buffer member 218 is formed of an elastic material such as rubber. The buffer member 218 is provided to protrude from the end surface of the guide body 24 by a predetermined length toward the piston 62 (in the direction of the arrow A).

Accordingly, when the supply of the pressure fluid to the pilot port 204 is stopped, and the piston 62 is displaced toward the guide body 216 (in the direction of the arrow B) by the resilient forces of the first and second springs 68a, 68b, then the piston 62 abuts against the buffer member 218, and thus the piston 62 does not make any direct contact with the guide body 216 to buffer the shock exerted upon the contact between the piston 62 and the guide body 216.

That is, the paint selector valve 200 according to the third embodiment is constructed as described above. Accordingly, the paint selector valve 200 is not provided in the manifold 28. Therefore, the pressure fluid can be supplied from the unillustrated pressure fluid supply source by directly connecting a piping or the like to the pilot port 204 formed on the outer circumferential surface of the main body 202. Similarly, the paint can be supplied from the paint supply source (not shown) by directly connecting a piping or the like to the supply port 208 formed on the outer circumferential surface of the sub-body 206. This arrangement is preferred, for example, when the single paint selector valve 200 is connected to the fluid passage 30 and the coating apparatus such as the nozzle.

Although certain preferred embodiments of the present invention have been shown and described in detail, it should be understood that various changes and modifications may be made therein without departing from the scope of the appended claims.

What is claimed is:

1. A paint selector valve for switching a supply state of a paint to be supplied to a fluid passage, said paint selector valve comprising:

a valve body which is connected to said fluid passage and which has a port for supplying said paint thereto;

a piston which is provided displaceably in an axial direction in said valve body under an action of a pressure fluid supplied to said valve body;

a shaft which is supported in said axial direction by said valve body and which is connected to said piston;

a valve seat section which is formed on said valve body and which makes communication with said fluid passage; and a valve plug which is connected to an end of said shaft and which has a truncated spherical seating section formed in the shape of a truncated sphere for being seated on said valve seat section, wherein said valve seat section has a side surface opposed to said truncated spherical seating section of said valve plug, said side surface being recessed with a substantially spherical seating surface corresponding to a spherical surface portion of said truncated spherical seating section, wherein said truncated spherical seating section is formed with a planar end surface which is opposed to said fluid passage with said valve seat section interposing therebetweeen and which is substantially perpendicular to an axis of said valve plug, wherein said planar end surface of said truncated spherical seating section is substantially parallel to said fluid passage when said valve plug is seated on said valve seat section and said planar end surface is substantially flush with a wall surface of said fluid passage, no part of said valve plug entering into said fluid passage in both seated and unseated conditions of said valve plug, and wherein installation grooves, to which a pair of seal members for surrounding said port are installed, are formed on an outer circumferential surface of said valve body, and each of said installation grooves has one wall section which is smaller in height than an opposing wall section, whereby said one wall section is open and is opposed to said port, thereby exposing said pair of seal members to the interior of said port.

2. The paint selector valve according to claim 1, wherein said shaft is inserted into a hole of said valve body, a clearance of a predetermined spacing distance is formed between said hole and an outer circumferential surface of said shaft, and said valve seat section is formed to have a tapered shape with a diameter gradually reduced toward said fluid passage.

3. The paint selector valve according to claim 2, wherein said shaft and said valve plug are provided swingably by said clearance between said hole and said shaft about a support point of a portion of abutment between said valve plug and said valve seat section.

4. The paint selector valve according to claim 1, wherein a groove, which is to be filled with a lubricant, is provided at a portion supported by said valve body on an outer circumferential surface of said shaft.

5. The paint selector valve according to claim 1, wherein said valve plug includes a diaphragm section which has a thin-walled skirt radially expanded outwardly, an outer edge section of said skirt being fixed to said valve body; and said shaft, to which said valve plug is connected, is provided with a protecting member which protects said diaphragm section at a position opposed to said diaphragm section.

6. The paint selector valve according to claim 1, wherein an indicator, which protrudes from an opening of said valve body under a displacement action of said shaft in said axial direction, is provided at an end of said shaft, and said indicator protrudes from said valve body in a valve-open state of said valve plug connected to said shaft.

7. The paint selector valve according to claim 1, wherein said valve body is installed to a manifold which has a plurality of installation holes, and said valve body is fixed to said installation hole by screwing a ring member with said installation hole after inserting said valve body into said installation hole.

8. The paint selector valve according to claim 1, wherein a radius of said spherical surface portion of said truncated spherical seating section is substantially equivalent to a radius of said valve seat section.

* * * * *